UNITED STATES PATENT OFFICE.

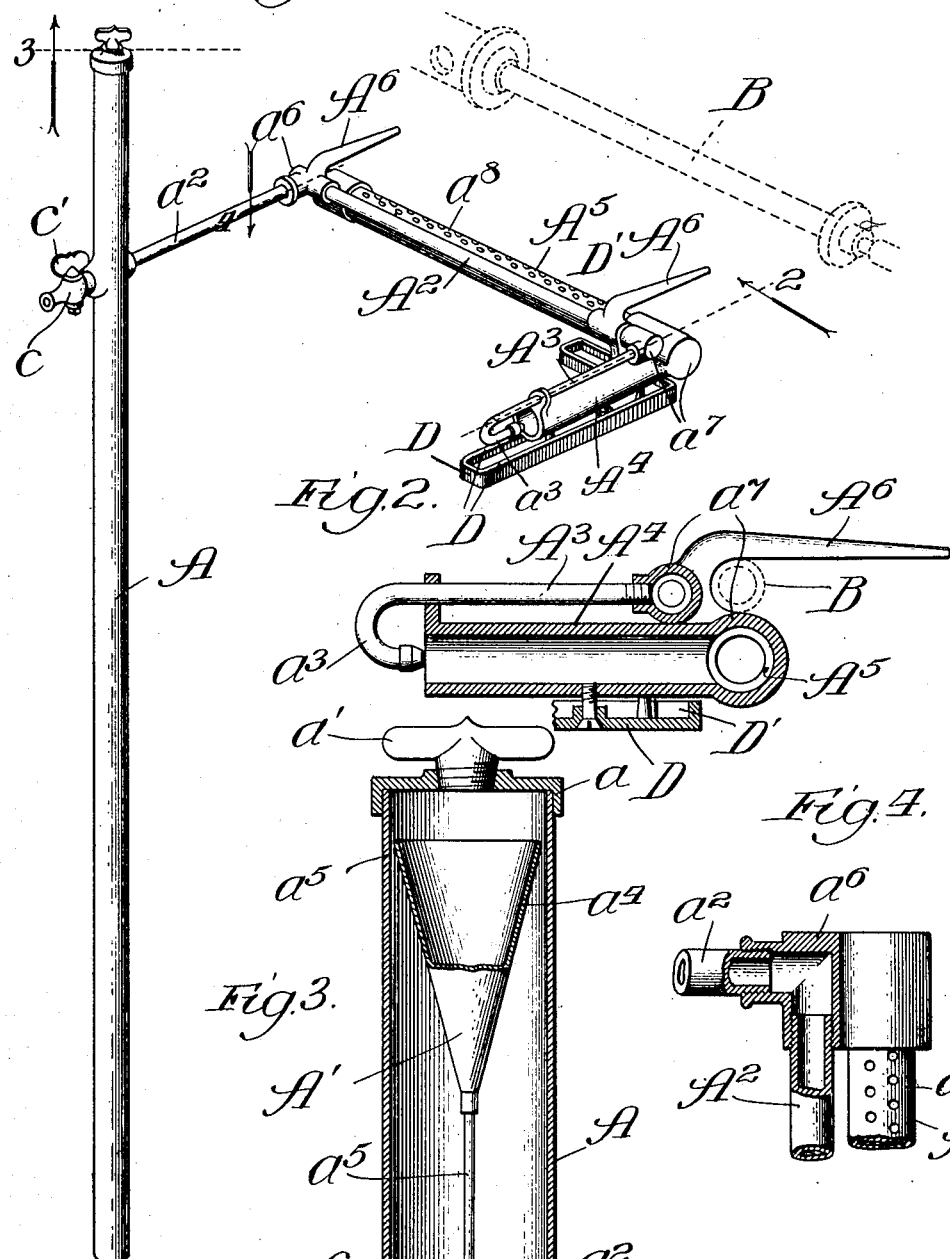

WILLIAM H. THAYER, OF CHICAGO, ILLINOIS.

SELF-GENERATING GAS-TORCH.

No. 895,597.　　　　Specification of Letters Patent.　　　Patented Aug. 11, 1908.

Application filed May 21, 1906. Serial No. 317,948.

*To all whom it may concern:*

Be it known that I, WILLIAM H. THAYER, a citizen of the United States, residing at Chicago, (Rogers Park,) in the county of Cook and State of Illinois, have invented a new and useful Improvement in Self-Generating Gas-Torches, of which the following is a specification.

My invention relates particularly to torches for use in preliminarily heating the retorts of self-generating gas-lamps.

My primary object is to provide a self-generating gas torch which shall be economical in operation and well adapted to the purpose of preliminarily heating the retorts of self-generating gas lamps.

The invention is illustrated in its preferred embodiment in the accompanying drawing, in which—

Figure 1 represents a perspective view of my improved self-generating gas torch, said view showing, in dotted lines, the generator of a self-generating gas lamp adapted to be heated by means of my improved torch; Fig. 2, an enlarged sectional view taken as indicated at line 2 of Fig. 1; Fig. 3, an enlarged broken sectional view taken as indicated at line 3 of Fig. 1; and Fig. 4, an enlarged broken section taken as indicated at line 4, Fig. 1.

In the preferred construction, the device comprises a tubular handle A adapted to serve as a main oil-chamber, said tubular member being equipped at its upper end with a cap $a$ fitted with a removable plug $a^1$; a feed, or measuring device $A^1$ mounted in the upper end of the member A and communicating with an outlet pipe $a^2$ extending at right angles to the pipe A; a generator pipe $A^2$ supported by and connected with the pipe $a^2$ and extending at right angles thereto; a gas tube $A^3$ carried by the free end of the tube $A^2$ and having a re-curved end $a^3$; a tubular member $A^4$ into which the gas is injected from the member $A^3$; a gas burner $A^5$; and a pair of retort-engaging arms $A^6$ projecting from the burner $A^5$ in a direction away from the handle A. The feed device $A^1$ comprises a hollow inverted frusto-conical member $a^4$, from the smaller lower end of which depends a tube $a^5$ communicating with the inner end of the pipe $a^2$, it being understood that the pipe $a^2$ has tight connection with the wall of the member A through which it passes. The member $a^4$, which serves as an oil-hopper, is centered with relation to the pipe A which contains it, and the upper end of the member $a^4$ is separated from the interior surface of the member A by a small annular space $a^5$. It will be understood that when the handle A is inverted allowing the liquid to run to the upper end, a quick reversion of the handle will cause a quantity of oil to be trapped by the hopper $a^4$, whence it will feed by gravity into the pipe $a^2$. The outer end of the pipe $a^2$ carries a fitting $a^6$, through which the pipe $a^3$ makes connection with the pipe $A^2$. The fitting $a^6$ forms one end of the tubular burner $A^5$ and carries one of the prongs or rests $A^6$. The member $A^4$ is formed integrally with a fitting $a^7$ which affords a cap for the free end of the tube $A^2$ and the free end of the burner-tube $A^5$. The tube $A^2$ communicates through said fitting with the tube $A^3$; and the tubular member $A^4$ communicates through said fitting with the burner-tube $A^5$. The burner-tube is provided on its upper surface with a series of rows of perforations $a^8$, a portion of which are adjacent to the generator tube $A^2$.

B represents the retort of a self-generating gas lamp, and it will be observed that the arms $A^6$ are spaced a sufficient distance above the burner $A^5$ to receive the retort B between them and the burner-tube $A^5$.

The operation may be explained briefly: When it is desired to preliminarily heat the retort of a self-generating gas lamp, a match may be applied to preliminarily heat the small tube $A^3$ after which the implement may be inverted and reverted to get a supply of oil into the chamber $a^4$, whence the oil will feed by gravity to the tube $A^3$ where gas will be formed and injected into the tubular member $A^4$, drawing with it the necessary air to form a combustible mixture. A match may then be applied to the burner-tube $A^5$, and the heat generated at the burner-tube will then suffice to generate gas in the tube $A^2$, the gas continuing to burn until the supply of oil in the vessel $a^4$ is exhausted. The device may then be raised until the arms $A^6$ are brought into engagement with the generator B of the self-generating gas lamp, whereupon the device may be allowed to remain with the burner-tube $A^5$ beneath the retort B a sufficient length of time to preliminarily heat the retort B. When the generation of gas in the retort B has progressed sufficiently, the gas lamp can be lighted, and the torch may then be employed for lighting other lamps.

I have shown the handle A, provided with an inlet nipple $c$ controlled by a stop-cock, $c^1$. If desired, air-pressure may be applied through the nipple to assist in forcing the oil into the retort.

It may be remarked further that the inclined walls of the vessel $a^4$ permit the surplus oil to be discharged from the vessel into the reservoir A by tilting the reservoir to a position approximating a horizontal position.

I have shown applied to the member $A^4$ a drip-pan, D, which has an angular extension $D^1$. In lighting the torch, oil is allowed to drip for a moment into the drip-pan, and a match is then applied. So soon as the gas enters the burner-tube, the flame is communicated thereto from the extension $D^1$ of the drip-pan.

What I regard as new, and desire to secure by Letters Patent, is:

1. The combination of a handle having an oil-reservoir, a tube projecting laterally from the upper portion of said handle, means located above the level of the said tube for supplying oil by gravity feed to said tube, a retort projecting at right angles to said tube, a burner-tube parallel to said retort, and means for delivering gas from the retort to the burner-tube and injecting air therewith into the burner-tube.

2. The combination of a handle having an oil-reservoir, a tube projecting laterally from the upper portion of said handle, a chamber located above said tube for supplying oil by gravity feed to said tube, a retort projecting at right angles to said tube, a burner-tube parallel to said retort, a tube projecting from the free extremity of the retort and having a recurved end, and a tubular member communicating with the free end of the burner-tube and having an open end adjacent to the recurved end of the tube projecting from the retort.

3. The combination of a handle having an oil-reservoir, a tube projecting at right angles from the upper portion thereof, a feed device in the upper portion of said reservoir communicating with said tube, a generator-tube communicating with the free end of said first-named tube, a burner-tube parallel with and adjacent to said generator-tube and having a plurality of burner orifices on its upper side, arms projecting laterally beyond the burner-tube, and means for delivering gas from the retort and injecting air therewith into the burner-tube.

4. The combination of a handle having an oil-reservoir, a tube projecting laterally from the handle, means for supplying oil to said tube, a retort-tube extending at right angles from the extremity of said first-named tube, a burner-tube parallel to the retort-tube, a tube extending parallel to said first-named tube from the free end of the retort-tube and having a recurved end, and an injector-tube communicating with the burner-tube and having an open end adjacent to the recurved end of the tube projecting from the free end of the retort-tube.

5. The combination of a handle having an oil-reservoir, a tube projecting laterally therefrom and extending through a wall thereof, a chamber within the upper portion of the reservoir having an opening at its upper end and having its lower end in communication with said tube, and a burner supplied from said tube.

6. The combination of a handle having an oil-reservoir, a tube projecting laterally therefrom and extending through a wall thereof, a chamber within the upper portion of the reservoir having an opening at its upper end and having its lower end in communication with said tube, and a retort and burner supplied from said tube.

7. The combination of a handle having an oil-reservoir, an inverted conical, hollow member in the upper portion of the reservoir having an opening at its upper end, a tube extending through a lateral wall of the reservoir and in communication with the lower end of said hollow member, and a burner supplied from said tube.

8. The combination of a tubular handle having a removable closure at its upper end, a feed-device having a chamber located in the upper end of said handle, a tube beneath the level of said chamber and projecting laterally from the handle and supplied from said chamber, and a burner supplied from said tube.

9. The combination of a handle having an oil-reservoir, a tube projecting laterally from the handle and receiving its supply from the reservoir thereof, a fitting on the extremity of said tube, a retort-tube and a burner-tube carried by said fitting, a fitting carried by the extremity of said retort-tube and burner-tube having a tubular member communicating with the burner-tube and having an open end, and a tube carried by said last-named fitting and in communication with said retort-tube and having a recurved end, for the purpose set forth.

WILLIAM H. THAYER.

Witnesses:
A. U. THORIEN,
J. H. LANDES.